(12) United States Patent
Roth

(10) Patent No.: US 9,300,464 B1
(45) Date of Patent: Mar. 29, 2016

(54) PROBABILISTIC KEY ROTATION

(71) Applicant: Amazon Technologies, Inc., Reno, NV (US)

(72) Inventor: Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 143 days.

(21) Appl. No.: 13/922,946

(22) Filed: Jun. 20, 2013

(51) Int. Cl.
*H04L 9/08* (2006.01)

(52) U.S. Cl.
CPC .................................. *H04L 9/0819* (2013.01)

(58) Field of Classification Search
CPC ........... H04L 9/00; H04L 9/08; H04L 9/0891; H04L 63/0428
USPC ........................................................ 380/278
See application file for complete search history.

(56) References Cited

U.S. PATENT DOCUMENTS

| | | | |
|---|---|---|---|
| 4,868,877 A | 9/1989 | Fischer | |
| 4,918,728 A | 4/1990 | Matyas et al. | |
| 5,146,498 A | 9/1992 | Smith | |
| 5,201,000 A * | 4/1993 | Matyas et al. | 380/30 |
| 5,495,533 A | 2/1996 | Linehan et al. | |
| 6,240,187 B1 | 5/2001 | Lewis | |
| 6,546,492 B1 | 4/2003 | Walker et al. | |
| 7,490,248 B1 | 2/2009 | Valfridsson et al. | |
| 7,565,419 B1 | 7/2009 | Kwiatkowski et al. | |
| 7,620,680 B1 | 11/2009 | Lamport | |
| 7,774,826 B1 | 8/2010 | Romanek et al. | |
| 7,877,607 B2 | 1/2011 | Circenis et al. | |
| 8,024,582 B2 | 9/2011 | Kunitz et al. | |
| 8,091,125 B1 | 1/2012 | Hughes et al. | |
| 8,111,828 B2 | 2/2012 | Raman et al. | |
| 8,245,037 B1 | 8/2012 | Durgin et al. | |
| 8,261,320 B1 | 9/2012 | Serenyi et al. | |
| 8,302,170 B2 | 10/2012 | Kramer et al. | |
| 8,607,358 B1 | 12/2013 | Shankar et al. | |
| 8,713,311 B1 | 4/2014 | Roskind | |
| 8,751,807 B2 * | 6/2014 | Ma et al. | 713/168 |
| 8,804,950 B1 * | 8/2014 | Panwar | 380/28 |
| 8,904,181 B1 | 12/2014 | Felsher et al. | |
| 2002/0141590 A1 * | 10/2002 | Montgomery | 380/277 |
| 2003/0093694 A1 | 5/2003 | Medvinsky et al. | |

(Continued)

FOREIGN PATENT DOCUMENTS

| | | |
|---|---|---|
| JP | 2000295209 | 10/2000 |
| WO | WO2011083343 | 7/2011 |

OTHER PUBLICATIONS

Bethencourt et al., "Ciphertext-Policy Attribute-Based Encryption," IEEE Symposium on Security and Privacy 2007, 15 pages.

(Continued)

*Primary Examiner* — Amare F Tabor
(74) *Attorney, Agent, or Firm* — Davis Wright Tremaine LLP

(57) ABSTRACT

Information, such as a cryptographic key, is used repeatedly in the performance of operations, such as certain cryptographic operations. To prevent repeated use of the information from enabling security breaches, the information is rotated (replaced with other information). To avoid the resource costs of maintaining a counter on the number of operations performed, decisions of when to rotate the information are performed based at least in part on the output of stochastic processes.

26 Claims, 9 Drawing Sheets

Probability of Event Occurring Passes Threshold

(56) References Cited

U.S. PATENT DOCUMENTS

| | | |
|---|---|---|
| 2003/0131238 A1 | 7/2003 | Vincent |
| 2003/0163701 A1 | 8/2003 | Ochi et al. |
| 2003/0172269 A1 | 9/2003 | Newcombe |
| 2003/0188188 A1 | 10/2003 | Padmanabhan et al. |
| 2004/0009815 A1 | 1/2004 | Zotto et al. |
| 2004/0093499 A1 | 5/2004 | Arditi et al. |
| 2004/0107345 A1 | 6/2004 | Brandt et al. |
| 2004/0193915 A1 | 9/2004 | Smith et al. |
| 2004/0223608 A1* | 11/2004 | Oommen et al. ............... 380/28 |
| 2005/0010760 A1 | 1/2005 | Goh et al. |
| 2005/0120232 A1 | 6/2005 | Hori et al. |
| 2005/0165859 A1 | 7/2005 | Geyer et al. |
| 2005/0246778 A1 | 11/2005 | Usov et al. |
| 2006/0018468 A1 | 1/2006 | Toba et al. |
| 2006/0021018 A1 | 1/2006 | Hinton et al. |
| 2006/0204003 A1 | 9/2006 | Takata et al. |
| 2006/0206932 A1 | 9/2006 | Chong |
| 2006/0291664 A1 | 12/2006 | Suarez et al. |
| 2007/0050641 A1 | 3/2007 | Flynn et al. |
| 2007/0180153 A1 | 8/2007 | Cornwell et al. |
| 2007/0230706 A1 | 10/2007 | Youn |
| 2008/0019527 A1 | 1/2008 | Youn et al. |
| 2008/0025514 A1 | 1/2008 | Coombs |
| 2008/0046984 A1 | 2/2008 | Bohmer et al. |
| 2008/0112561 A1 | 5/2008 | Kim |
| 2008/0127279 A1 | 5/2008 | Futa et al. |
| 2008/0298590 A1* | 12/2008 | Katar et al. ............... 380/258 |
| 2008/0319909 A1 | 12/2008 | Perkins et al. |
| 2009/0025087 A1 | 1/2009 | Peirson, Jr. et al. |
| 2009/0034733 A1 | 2/2009 | Raman et al. |
| 2009/0158033 A1 | 6/2009 | Jeong et al. |
| 2009/0165076 A1 | 6/2009 | Decusatis et al. |
| 2009/0276514 A1 | 11/2009 | Subramanian |
| 2009/0300356 A1 | 12/2009 | Crandell |
| 2010/0008499 A1 | 1/2010 | Lee et al. |
| 2010/0014662 A1 | 1/2010 | Jutila |
| 2010/0017626 A1* | 1/2010 | Sato et al. ............... 713/193 |
| 2010/0138218 A1 | 6/2010 | Geiger |
| 2010/0211781 A1 | 8/2010 | Auradkar et al. |
| 2010/0303241 A1 | 12/2010 | Breyel |
| 2010/0316219 A1 | 12/2010 | Boubion et al. |
| 2010/0325732 A1 | 12/2010 | Mittal et al. |
| 2011/0116636 A1 | 5/2011 | Steed |
| 2011/0154057 A1 | 6/2011 | England et al. |
| 2011/0173435 A1 | 7/2011 | Liu et al. |
| 2011/0191462 A1 | 8/2011 | Smith |
| 2011/0246765 A1 | 10/2011 | Schibuk |
| 2012/0079289 A1 | 3/2012 | Weng et al. |
| 2012/0134495 A1 | 5/2012 | Liu |
| 2012/0140923 A1 | 6/2012 | Lee et al. |
| 2012/0191979 A1 | 7/2012 | Feldbau |
| 2012/0198042 A1 | 8/2012 | Dunbar et al. |
| 2012/0204032 A1 | 8/2012 | Wilkins et al. |
| 2012/0260094 A1 | 10/2012 | Asim et al. |
| 2012/0266218 A1 | 10/2012 | Mattsson |
| 2012/0290850 A1 | 11/2012 | Brandt et al. |
| 2012/0291101 A1 | 11/2012 | Ahlstrom et al. |
| 2012/0300936 A1 | 11/2012 | Green |
| 2012/0303961 A1* | 11/2012 | Kean et al. ............... 713/171 |
| 2012/0311675 A1 | 12/2012 | Ham et al. |
| 2012/0314854 A1 | 12/2012 | Waters |
| 2012/0323990 A1 | 12/2012 | Hayworth |
| 2013/0044878 A1 | 2/2013 | Rich et al. |
| 2013/0157619 A1 | 6/2013 | Di Luoffo et al. |
| 2013/0163753 A1 | 6/2013 | MacMillan et al. |
| 2013/0316682 A1 | 11/2013 | Vieira |
| 2013/0326233 A1 | 12/2013 | Tolfmans |
| 2014/0012751 A1 | 1/2014 | Kuhn et al. |
| 2014/0177829 A1 | 6/2014 | MacMillan et al. |

OTHER PUBLICATIONS

International Search Report and Written Opinion mailed Apr. 29, 2014, in International Patent Application No. PCT/US2014/015404, filed Feb. 7, 2014.

International Search Report and Written Opinion mailed May 30, 2014, in International Patent Application No. PCT/US2014/015408, filed Feb. 7, 2014.

International Search Report and Written Opinion mailed May 30, 2014, in International Patent Application No. PCT/US2014/015410, filed Feb. 7, 2014.

International Search Report and Written Opinion mailed May 30, 2014, International Patent Application No. PCT/US2014/015414, filed Feb. 7, 2014.

International Search Report and Written Opinion mailed May 28, 2014, in International Patent Application No. PCT/US2014/15697, filed Feb. 11, 2014.

IEEE, "Draft Standard for Identity-based Public-key Cryptography Using Pairings," IEEE P1363.3/D1, Apr. 2008, retrieved Sep. 22, 2015, from http://grouper.ieee.org/groups/1363/IBC/material/P1363.3-D1-200805.pdf, 85 pages.

Krawczyk et al., "HMAC-based Extract-and-Expand Key Derivation Function (HKDF)," Internet Engineering Task Force (IETF), May 2010, retrieved Sep. 22, 2015, from https://tools.ietf.org/html/rfc5869, 14 pages.

Rescorla, "Diffie-Hellman Key Agreement Method," Network Working Group, RTFM Inc., Jun. 1999, retrieved on Sep. 22, 2015, from https://tools.ietf.org/html/rfc2631, 13 pages.

Wikipedia, "IEEE P1363 an Institute of Electrical and Electronics Engineers (IEEE) standardization project for public-key cryptography," retrieved Sep. 22, 2015, from https://en.wikipedia.org/wiki/IEEE_P1363, 3 pages.

Wikipedia, "Key derivation function," retrieved Sep. 22, 2015, from https://en.wikipedia.org/wiki/Key_derivation_function, 4 pages.

Sieloff, "The new systems administrator: The role of becoming root," Inside Solaris, Oct. 2002, 8(10):6-9.

* cited by examiner

PROBABILISTIC KEY ROTATION

CROSS-REFERENCE TO RELATED APPLICATIONS

This application incorporates by reference for all purposes the full disclosure of U.S. patent application Ser. No. 13/764,944, filed on Feb. 12, 2013, entitled "AUTOMATIC KEY ROTATION" and U.S. patent application Ser. No. 13/916,999, filed on Jun. 13, 2013, entitled "KEY ROTATION TECHNIQUES."

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

BRIEF DESCRIPTION OF THE DRAWINGS

Various embodiments in accordance with the present disclosure will be described with reference to the drawings, in which.

DETAILED DESCRIPTION

Figure 1:
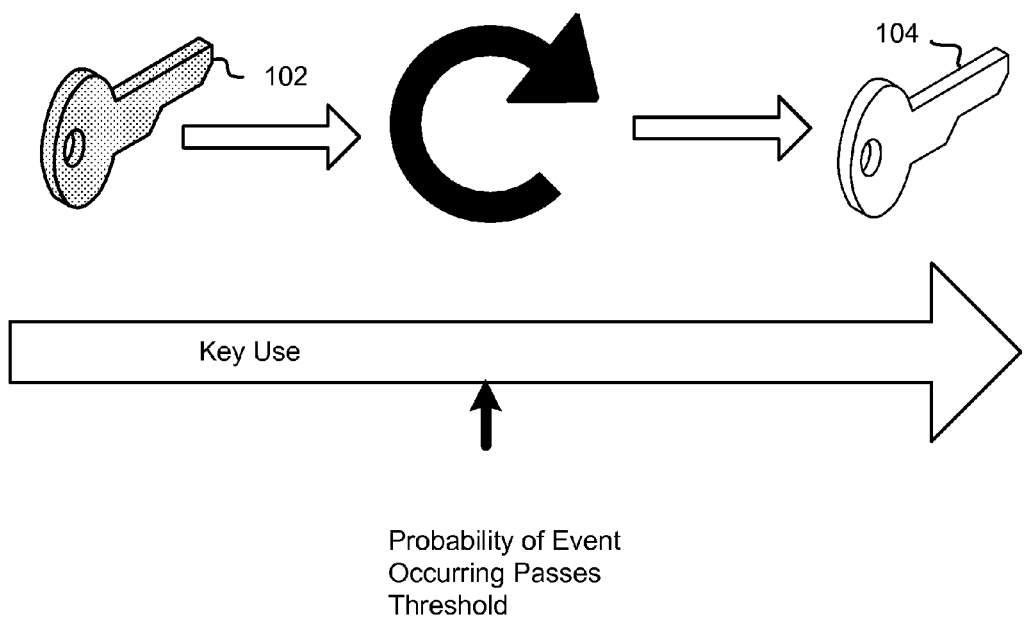
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for data security in a manner that reduces the burden of such enhancements. In various embodiments, cryptographic keys (also referred to simply as keys) and other information are used to encrypt data. Generally, for the purpose of simplicity and efficiency, it is desirable to use the same cryptographic key multiple times. However, multiple uses of the same key for certain operations (such as encryption or message signing) can result in the generation of information (e.g., ciphertext or electronic signatures) that can be used in a cryptographic attack. Generally, the more often a cryptographic key is used in such operations, the more information is generated. The more of such information a malicious party has access to, the less difficult a cryptographic attack (e.g., where the key can be successfully guessed) becomes.

In various embodiments, cryptographic keys are probabilistically rotated. In some examples, when a request to perform a cryptographic operation is received, a stochastic process is performed to generate one or more values. As an example, a random number generator or pseudorandom number generator may be used to generate one or more numbers. The generated values may be used as arguments for conditions (also referred to as key rotation criteria) that are checked. As a result of the conditions being satisfied, a rotation of the corresponding key may be performed. As an illustrative example, an integer value may be stochastically generated. If the integer value satisfies a certain property (such as being divisible by a certain number) the key may be rotated. Rotation of the key may be performed by, for instance, replacing the key with a new key for future operations and updating metadata associated with the key/new key accordingly. The stochastic process and conditions applied to the output thereof may be configured to keep the probability of certain events from passing a threshold. For instance, in cryptographic ciphers that utilize nonces, it may be desirable to avoid use of the same nonce with the same cryptographic key for multiple operations. Accordingly, the stochastic process and conditions applied to the output of the stochastic process may be configured such that the probability of the same nonce being used with the same cryptographic key is below some acceptable threshold.

In some embodiments, more complex stochastic processes are utilized to change the shape of an applicable probability distribution in an advantageous manner. For instance, the stochastic process may be configured such that, on average, a greater number of operations (relative to more simple processes, such as by checking the output of a random number generator) are performed before a key is rotated. For instance, in some embodiments, a counter is probabilistically rotated. The output of a stochastic sub-process may be used to determine whether to update the counter. A threshold on the counter may be used to determine whether to rotate a key. In this manner, the probability of the undesired event occurring can be kept within an acceptable range while reducing the probability of a key rotation for lower numbers of operations using the key.

In some examples, while the various embodiments include those in non-distributed systems, operations using keys are performed using multiple devices (such as security modules) in a distributed system. In such distributed systems, the techniques described and suggested herein provide numerous technical advantages. For example, maintaining an accurate counter in a distributed system (to prevent the occurrence of an undesirable event from occurring) is a complex matter that requires significant computing resources such as network bandwidth. Therefore, the various embodiments of the present disclosure allow for determinations of when to perform key rotation in a manner that provides enhanced security while using significantly fewer resources. In particular, the stochastic processes used and conditions applied to the output of the stochastic processes can be configured such that an accurate counter of the number of operations performed is unnecessary for achieving high levels of security.

FIG. 1 is an illustrative example of a diagram illustrating various aspects of the present disclosure. As noted above, techniques described herein are applicable to insuring data security using cryptographic keys. Accordingly, FIG. 1 shows a cryptographic key 102 which is used to perform cryptographic operations whose output can contribute to cryptographic key wear out, which is a condition where a cryptographic key is used in a particular way enough times that the danger of a successful cryptographic attack by someone with access to the output of the operations exceeds an acceptable level. Example operations that can cause cryptographic operations are operations that take plaintext as input and produce output, such as ciphertext or electronic (digital) signatures. As one example, many cryptographic cyphers, such as the Galois/counter mode of the Advance Encryption Standard (AES-GCM) utilize a nonce or other initialization value or vector. Use of the same key/nonce in multiple operations (even two operations) can provide enough information to unacceptably decrease the security of data encrypted under the key. As another example, enough blocks of encrypted data generated using the same key (and nonce, if applicable) can allow a cryptographic attacker to use a lookup table to determine the key in a known plaintext attack. Generally, for most practical cryptographic ciphers, cryptographic attacks become more and more possible as the same key is used again and again for certain operations.

Accordingly, as illustrated in FIG. 1 as the key 102 is used for such operations, the key is rotated at a point in time so as to maintain data security and keep the likelihood of a successful cryptographic attack below an acceptable level. In various embodiments of the present disclosure, the key 102 is rotated at a point in time when the probability of an event occurring (such as a repeated use of the same nonce/key pair) reaches a threshold. The threshold may be a a value selected based at least in part on an acceptable level of security. For instance, as a specific example, the threshold may be that a key rotation occurs when the probability of the event occurs reaches 1 in $2^{32}$ (i.e., 1 divided by 4,294,967,296). Rotation of the key 102 may be performed by replacing the key 102 with a new key 104. As an example, in a key management system (also referred to as a cryptography service) the key 102 may have an associated identifier of the key 102. Multiple users (e.g., customers) may utilize the system and have their own identifiers for their own keys. The new key 104 may become associated with the identifier for the key 102 and other changes to the key management system may be accomplished so that the key management system utilizes the new key 104 for future encryption and/or message signing operations. The key 102 that has been rotated may remain available for various purposes, such as decryption of data encrypted using the key 102.

Figure 2:
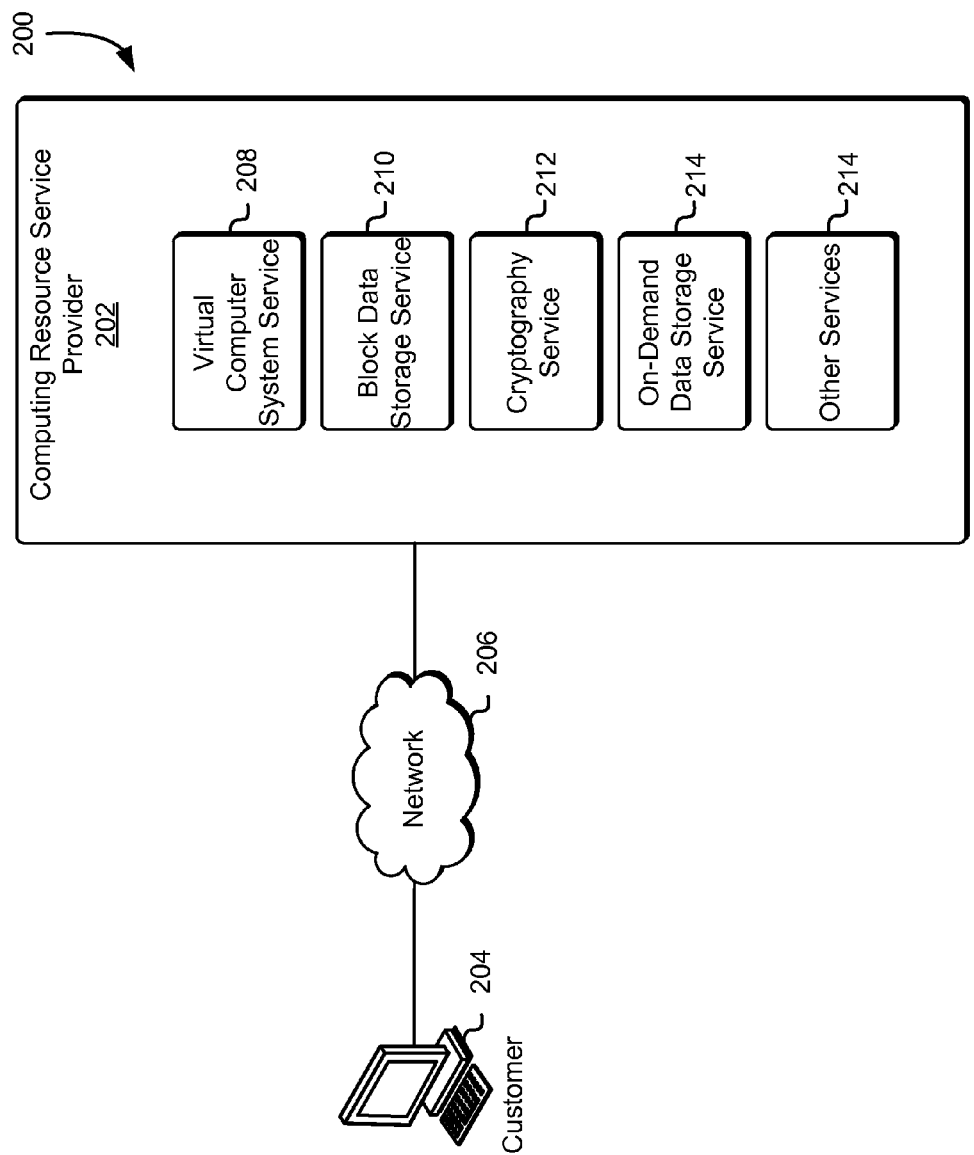
FIG. 2 shows an illustrative example of an environment in which various embodiments may be practiced.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to maintain and deliver information to its employees, which may be located in various geographical locations. Additionally, the customer 204 may be an individual that could utilize the various services to deliver content to a working group located remotely. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. The services provided by the computing resource service provider, in this example, include a virtual computer system service 208, a block-level data storage service 210, a cryptography service 212 (also referred to as a key management service), an on-demand data storage service 214 and one or more other services 216, although not all embodiments of the present disclosure will include all such services and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service and/or to access one or more block-level data storage devices provided by the block data storage service).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications.

The block-level data storage service 210 may comprise a collection of computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

As illustrated in FIG. 2, the computing resource service provider 202 may operate a cryptography service, which is described in more detail below in connection with FIG. 3. Generally, the cryptography service may be a collection of computing resources collectively configured to manage and use cryptographic keys for customers of the computing resource service provider. Keys used by the cryptography service 212 may have associated identifiers that the customers can reference when submitting requests to perform cryptographic operations (such as encryption, decryption and message signing) and/or other operations, such as key rotation. The cryptography service may securely maintain the cryptographic keys to avoid access by unauthorized parties.

The computing resource service provider 202 may also include an on-demand data storage service. The on-demand data storage service 214 may be a collection of computing resources configured to synchronously process requests to store and/or access data. The on-demand data storage service 208 may operate using computing resources (e.g., databases) that enable the on-demand data storage service 208 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects which may be used by the customer 204 to retrieve or perform other operations in connection with the data objects stored by the on-demand data storage service 210. The on-demand data storage service 214 may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

The computing resource service provider 202 may additionally maintain one or more other services 216 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As discussed above, various embodiments of the present disclosure are directed to providing cryptography services. Cryptography services may be provided by a cryptography service system such as described above. FIG. 3 accordingly shows an illustrative example of a cryptography service 300 in accordance with various embodiments. As illustrated in FIG. 3 and as discussed above, the cryptography service 300 is logically comprised of a frontend system and a backend system. Both the frontend system and the backend system may be implemented by one or more computer systems configured to perform operations described herein. For example, as illustrated in FIG. 3, the frontend system of the cryptography service 300 implements a request API 306 and a policy configuration API 308. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available:
    CreateKey(KeyID)
    Encrypt(KeyID, Data, [AAD])
    Decrypt(KeyID, Ciphertext, [AAD])
    Shred(KeyID)
    ReKey(Ciphertext, OldKeyID, NewKeyID).

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be, but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt (KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD]) request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeros or ones or a random string) and/or by removing power to volatile memory in which the key is stored. If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the NewKeyID does not yet exist, the cryptography service may generate a key to use and associate the generated key with the specified NewKeyID, such as described in connection the Create(KeyID) request described above. In some embodiments, the ReKey operation may be operable to cause data to be transferrable between isolated instances of a cryptography service. In some embodiments, a policy might permit a rekey operation to be performed on a ciphertext but might not permit the same requestor to directly decrypt the ciphertext. In some embodiments, ReKey might support rekeying a ciphertext from a key identified by a first KeyID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users and other logical entities in various embodiments. Example policies, which may be configured via the policy configuration API, are provided below. In an embodiment, the cryptography service policy configuration API includes the following requests:

SetKeyPolicy(KeyID, Policy)
Suspend(KeyID, Public Key)
Reinstate(KeyID, Private Key)

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate (KeyID, Private Key) API call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided ciphertext and re-import the suspended key. In some embodiments the ciphertext may be generated in a manner that will prevent the cryptographic service from returning a decrypted version to the customer.

Figure 3:
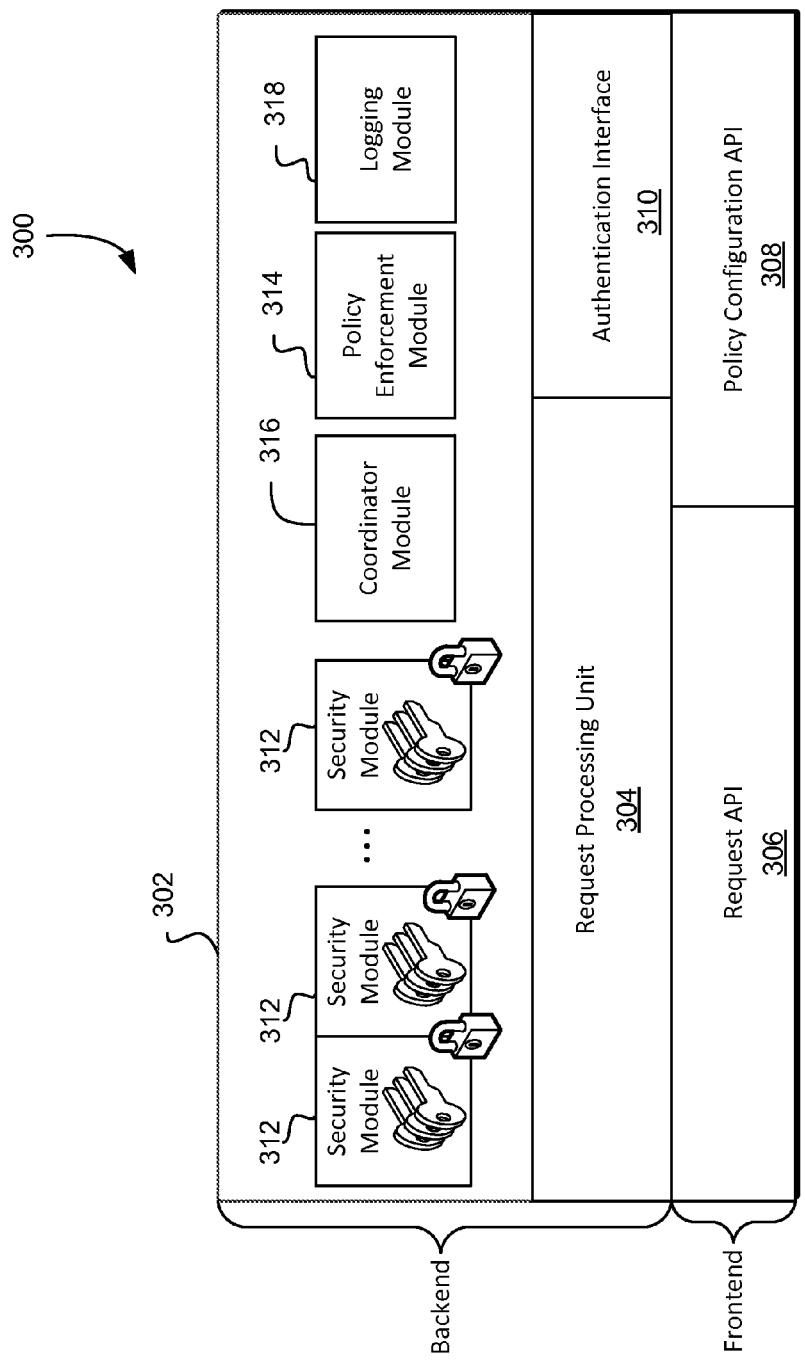
FIG. 3 shows an illustrative example of components of a cryptography service in accordance with an embodiment.

As illustrated in FIG. 3, the cryptography service 300 includes a backend system 302 that itself comprises various components in some embodiments. For example, the backend system in this example includes a request processing system (also referred to as a request processing unit or request processing component) 304 which may be a subsystem of the cryptography service 300 that is configured to perform operations in accordance with requests received through either the request API 306 or the policy configuration API 308. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 310 which enables the request processing unit to determine whether requests are authentic. The authentication interface may be configured to interact with an authentication system, which may be an authentication system utilized by multiple services of a computing resource service provider. For example, when a request is received by the request processing unit, the request processing unit may utilize the authentication interface to interact with an authentication service which may, if applicable, provide authentication proof that may be used in order to cause a performance of cryptographic operations. The request processing system 304 may also be configured with an interface that enables interaction with other services of a computing resource service provider. For example, in embodiments where customer keys are stored in encrypted form in a data storage service, the request processing system 304 may submit API calls to the data storage service to obtain customer keys when needed. The cryptography service may also store customer keys in encrypted form in a local data storage system or in encrypted or unencrypted form in one or more security modules 312, discussed below.

The backend system of the cryptography service 300, in this illustrative example, includes a plurality of a security modules 312 (cryptography modules), a policy enforcement module 314, and a coordinator module 316. The coordinator module may be a system configured to coordinate the security modules 312. For example, in some embodiments, the coordinator module is configured to ensure that security modules 312 identified as members of a cryptographic domain (also referred to simply as "domain") operate in accordance with consistent operational parameters for the domain. As one example, each security module may have access to a domain key for the domain. Customer keys may be encrypted under the domain key and stored externally to the security modules (e.g., in the backend system and/or using a data storage service), thereby enabling the security modules 312 to operate without the need to store all customer keys that the security modules may use. Briefly, when a customer requests that a cryptographic operation be performed using a key identified by a KeyID, the encrypted customer key identified by the KeyID may be provided to a security module that can use the domain key to decrypt the customer key and use the decrypted customer key to perform the requested operation using the decrypted customer key.

As another example, the coordinator module 316 may be configured to ensure that the security modules 312 each enforce a common set of rules before accepting (e.g., reconfiguring) to an updated set of operational parameters. For instance, each security module may enforce quorum rules that defines one or more sets of operators that are sufficient for authorizing certain changes to the operational parameters, such as changes to the domain key (e.g., to rotate the domain key), changes to the members of the set of security modules comprising the domain, changes to a set of operators for the domain (e.g., those authorized to participate in causing changes to be made to the domain) and the like.

In the embodiment described in FIG. 3, one or more of the security modules may be hardware security modules although, in various embodiments, a security module may be any suitable computer device configured according to have capabilities described herein. Each security module, in an embodiment, either stores a plurality of keys associated with KeyIDs and/or stores keys under which externally stored keys associated with KeyIDs are encrypted. Each security module may be configured to securely store the keys so as to not be accessible by other components of the cryptography service 300 and/or other components of other systems. For instance, in some embodiments in which security modules store domain keys as described above, only security modules of a domain may store a corresponding domain key. All other entities may lack access to the domain key.

In various embodiments, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). As noted, a security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit 304. For example, the request processing unit may provide ciphertext and a KeyID to an appropriate security module with instructions to the security module to use a key associated with the KeyID to decrypt the ciphertext and provide in response the plaintext. In embodiments where customer keys are stored externally to security modules, the request processing unit 304 may access an encrypted version of the key identified by the KeyID (e.g. from a local storage system or an external cryptography service) and provide the encrypted version of the key to the security module, which can then decrypt and then use the key.

In an embodiment, the backend system of the cryptography service 300 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module 314 is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 3 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

As illustrated in FIG. 3, the cryptography service 300 may include a logging module 318. The logging module may be a system configured to perform various activities in connection with tracking various operations of the cryptography service. For example, requests submitted to the request API 306 may be logged by the logging module 318 in association with other data, such as, for each request, an identifier of the customer on behalf of whom the request was purportedly submitted, an identity associated with the customer (e.g., employee or contractor) that transmitted the request, the type of the request (e.g., which of several API call types was used), whether the request was approved, whether the request was fulfilled, any reasons the request was not approved (if applicable), an identifier of a key used in fulfilling the request, and the like. The logging module may also be configured to maintain counters for keys identified by KeyIDs. When information is received by the logging module that indicates one or more operations have been performed using a key, the logging module may update the counter for the key accordingly. The counter may be updated for operations of a type that contribute to cryptographic key wear out. For instance, an encryption operation may cause the counter to increase whereas a decryption operation may not. It should be noted that, in some embodiments, counters are not to be maintained by the logging module, but counters are to be updated by accessing logs from the logging module and calculating the number of operations that have been performed.

Figure 4:
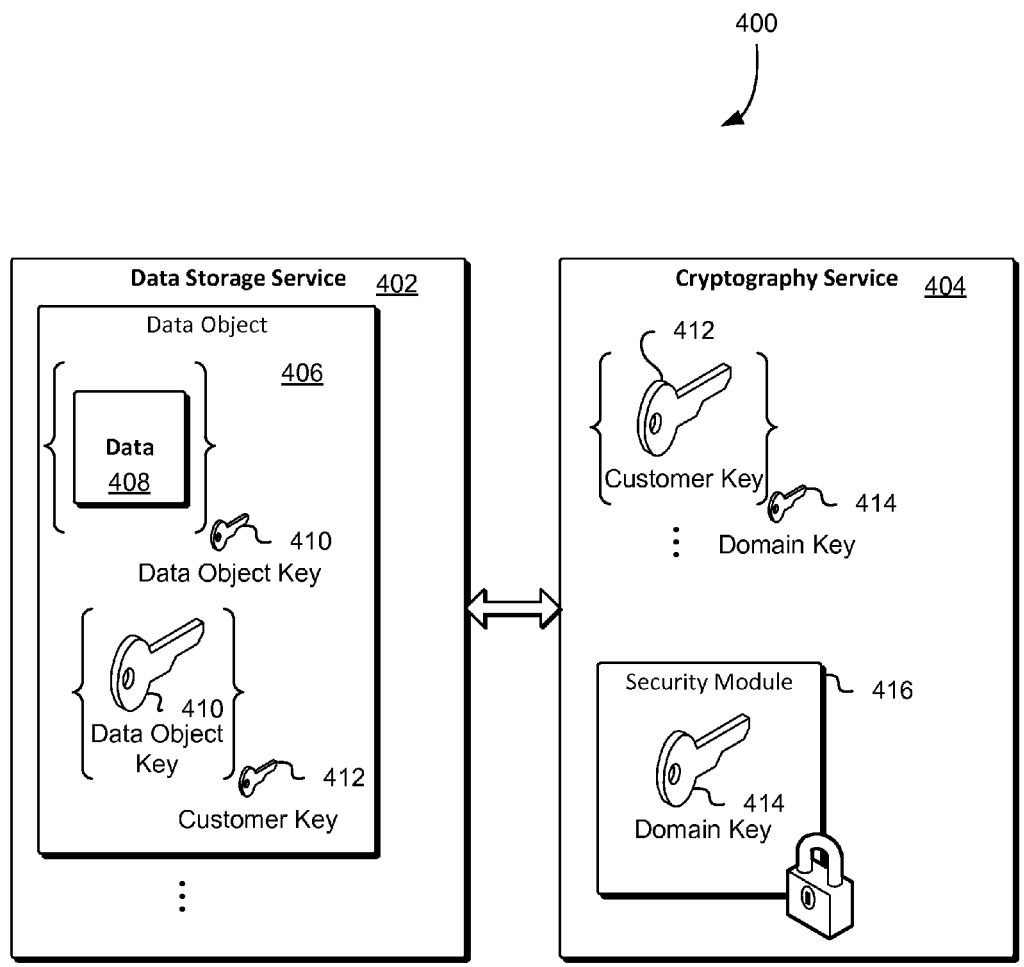
FIG. 4 shows a diagram illustrating a manner in which data may be stored in accordance with at least one embodiment.

To enable various efficiencies and security enhancements, a cryptography service may store and utilize cryptographic keys in various ways. Further, as noted above, a cryptography service may operate in connection with other services such as data storage services. FIG. 4 accordingly shows an illustrated example of an environment 400 in which various services may operate concurrently. As illustrated in FIG. 4, a data storage service 402 is configured to communicate with a cryptography service 404. For example, the data storage service 402 and the cryptography service 404 may be configured to configure appropriate API calls to each other for the purpose of transferring information and submitting requests and responses to the requests to one another.

As noted above, a data storage service 402 may store a plurality of data objects 406. Some, or even all, of the data objects 406 may be encrypted utilizing the cryptography service 404. As illustrated in cryptography services 404, data 408 of the data object 406 may be encrypted under a data object key 410. The data object 406 may also include the data object key 410 encrypted under a customer key 412 of a customer of the data storage service and the cryptography service 404. In other words, the data object 406 may include data encrypted under a key and the key encrypted under another key. In this manner, the data of the data object is stored in encrypted form with the key usable to decrypt the data, but the key is in encrypted form for the purpose of security. In other words, unauthorized access to the data object does not, by itself, enable access to the data inside of the data object in plaintext form. As shown in FIG. 4, the cryptography service 404 may store the customer key 412 encrypted under a domain key 414 such as described above. For instance, a cryptography service may store the customer key 412 encrypted under the domain key 414 in a repository of the cryptography service (not shown) or in an external data storage service.

As noted, the cryptography service 404 may store multiple customer keys in this manner. As further noted above, the cryptography service 404 may include a plurality of security modules 416 such as described above that store securely the domain key 414. In this manner, the data storage service 402 may interact with the cryptography service 404 for decryption of the data object key. The data storage service 402 may, for instance, provide the data object key 410 encrypted under the customer key 412 to the cryptography service 404. The cryptography service 404 may utilize a security module 416 to use the domain key 414 to decrypt the customer key 412 and use the customer key 412 to decrypt the data object key 410. The data object key 410 in plain text form may then be provided to the data storage service 402, which may then use the data object key 410 to decrypt the data 408.

Variations, of course, are considered as being within the scope of the present disclosure. For example, the security module 416 may be used to decrypt the data 408 using the data object key 410, thereby never providing the data storage service 402 access to the data object key 410.

As illustrated in FIG. 4, multiple cryptographic keys may be used directly or indirectly for encryption of data and/or for performing other cryptographic operations. Some or all of the keys involved may be rotated, in accordance with the various techniques described herein to maintain security for systems utilizing the keys and/or for data encrypted under any of the keys.

Figure 5:
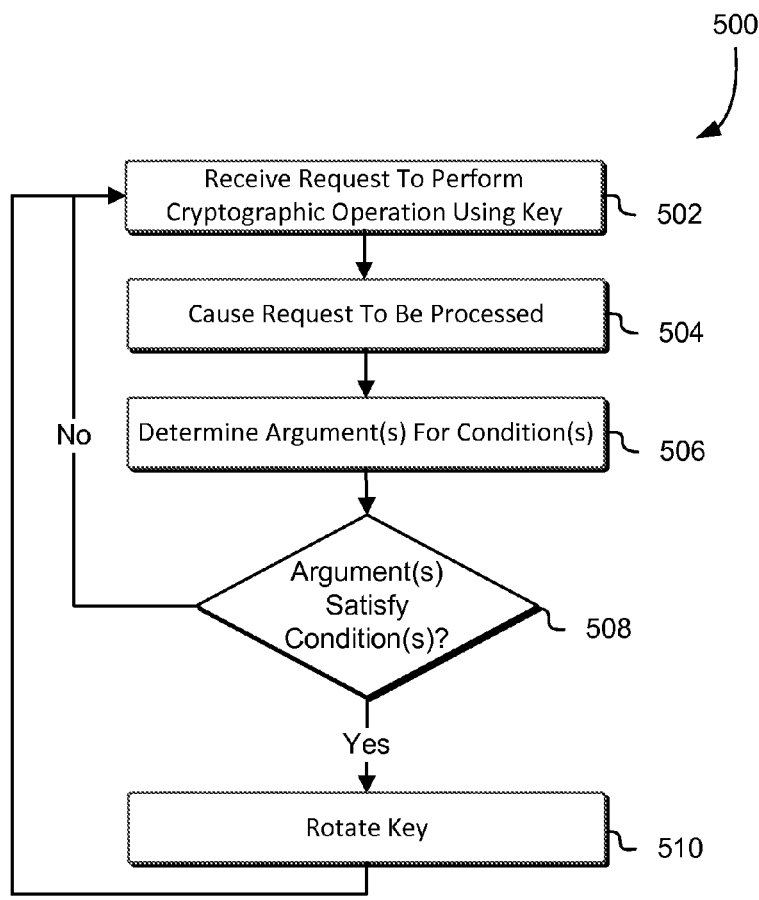
FIG. 5 shows an illustrative example of a process for managing key rotation in accordance with an embodiment.

FIG. 5 shows an illustrative example of a process 500 which may be used to enhance data security. The process 500 may be performed by any suitable system, such as by the cryptography service described above in connection with FIG. 3 and/or an appropriate component thereof, such as by a webserver operating to provide the request API 306. Returning to FIG. 5, in an embodiment the process 500 includes receiving 502 a request to perform a cryptographic operation using a key. The request to perform the cryptographic operation may be received in any suitable manner. For example, referring to FIG. 3 the request may come in the form of an appropriately configured API call to the request API 306. A request may also be received internally within a system, such as from one component to another. The request that was received 502 may include various information that enables the request to be processed. Information may include, for example, information suitable to authenticate the request and/or in some embodiments an identifier for the key to be used. As illustrated in FIG. 5, upon receipt 502 of the request to perform a cryptographic operation using the key the process 500 may include causing 504 the request to be processed. Referring to FIG. 3, for example, causing 504 the request to be processed may include the request processing unit 304 to select an appropriate security module 312 to perform the cryptographic operation that was requested. Causing the request to be processed may include generating (or causing to be generated) a nonce or other initialization vector in embodiments where initialization vectors are used. In some embodiments, the nonce or other initialization vector is randomly or pseudorandomly generated.

The process 500 may also include determining 506 one or more arguments for one or more conditions for when the key should be rotated. Examples of arguments and conditions are described in more details below and, generally, the conditions may be one or more criteria that, when satisfied, result in rotation of a key. Briefly, as described below, determining the one or more arguments may be performed by performing a process to generate outcome having a known probability of occurring. The conditions may be configured based at least in part on the outcome. For instance, determining the one or more arguments may include performing a process that has a probability P of producing a particular outcome. A condition may be that the particular outcome occurs. Accordingly, the process 500 includes determining 508 whether the determined one or more arguments satisfy the one or more conditions. If it is determined 508 that the one or more arguments satisfy the one or more conditions, the process 500 includes rotating 510 the key.

Rotating 510 the key may be performed in any suitable manner. For example, referring to FIG. 3 a distributed system may utilize a plurality of security modules that each have access to the key. Rotating the key may be performed by causing the security modules to each have access to a new key to replace the key being rotated. Example processes that can be used to rotate keys include those described in U.S. patent application Ser. No. 13/764,944, filed on Feb. 12, 2013, titled Automatic Key Rotation and those described in U.S. patent application Ser. No. 13/916,999, filed on Jun. 13, 2013, and titled Key Rotation Techniques, both of which are incorporated by reference in their entirety for all purposes. As another example, as noted above, customer keys may be stored externally to security modules in a form encrypted using a key accessible to the security modules (e.g., a domain key). Rotating a key may include providing the encrypted key to a security module able to decrypt the key, generate a new key, encrypt the new key, and provide the encrypted new key. Further, rotating the key is not necessarily performed synchronously. For example, in some embodiments, an asynchronous process being performed by a system may be configured to rotate the key as part of its processing. Such a process may be, for instance, a background process that performs key rotation, garbage collection and/or other operations asynchronously. The process may be configured such that the key is eventually rotated over some time period, but not necessarily immediately. Generally, rotating the key may be performed by any suitable manner that results in the key being replaced by another key for future use in operations that contribute to cryptographic key wear out.

If it is determined 508 that the one or more arguments do not satisfy the one or more conditions (i.e., that the one or more arguments fail to satisfy a set of key rotation criteria), the key may be remain available for future use in such operations. Accordingly the process 500 may repeat such as described above. Similarly, once the key is rotated 510 the process 500 may be repeated as additional requests to perform cryptographic operations are performed. In this manner, the process 500 may be performed to manage key rotation without the need to maintain, in a distributed system, an accurate counter of use of the key to ensure that the key is not used enough times to provide a decrease in security beyond acceptable bounds. In other words, a technical advantage is achieved by defining conditions for key rotation in a manner that keeps the probability of undesirable events occurring below an acceptable threshold.

Figure 6:
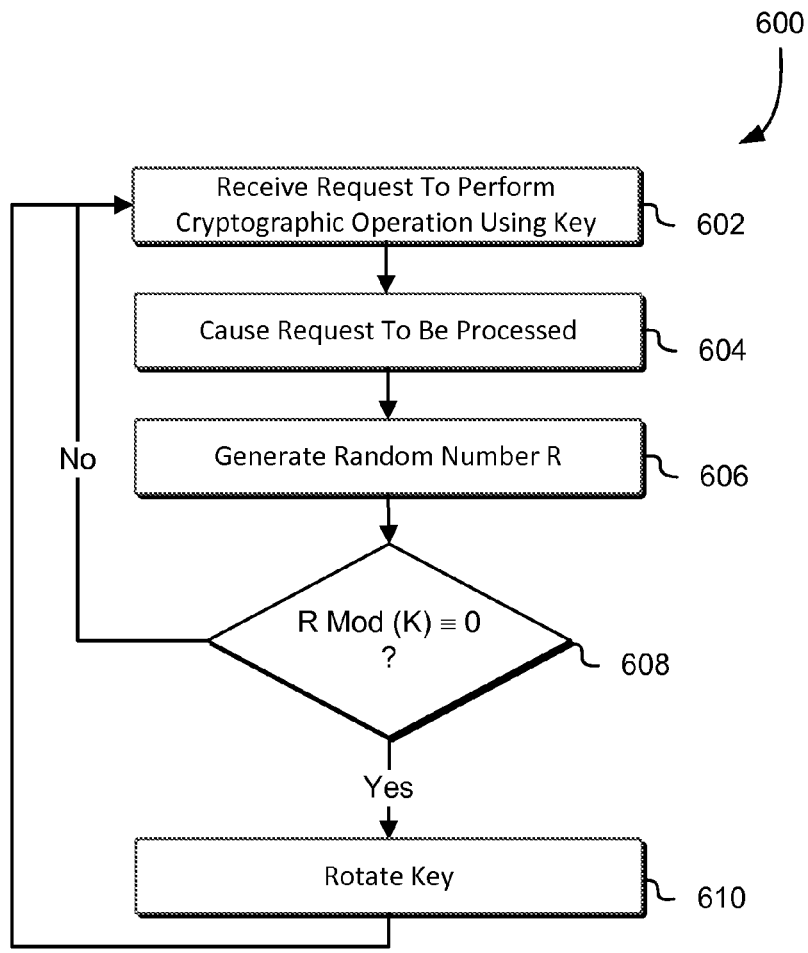
FIG. 6 shows an illustrative example of a process for managing key rotation in accordance with an embodiment.

FIG. 6 shows an illustrative example of a process 600 for managing key rotation. The process 600, in this example, is a more specific, illustrative example of the process 500 discussed above in connection with FIG. 5. Accordingly, a system performing the process 500 may be a device performing the process 600. In an embodiment the process 600 includes receiving 602 a request to perform a cryptographic operation using a key. The request may be received and configured as described above. In addition, as with the process 500 discussed above in connection with FIG. 5, the process 600 includes causing 604 the request to be processed. The process 600 also as illustrated in FIG. 6 includes generating 606 a random number R which in reference to FIG. 5 may be an argument for a condition. The number R, in this example, is an integer in a range of integers that has length of at least K, where K is a positive integer. R, for instance, may be allowed to be a value between 0 and $N*K-1$, where N is a positive integer. R may be generated using a random or pseudorandom number generator configured to determine values within the set of acceptable R (e.g., within a range) where the set of acceptable values for R and the integer K are selected so that the probability of R being equivalent to zero modulo K (i.e., the probability of R being an integer multiple of K) is a predetermined amount such that, if R is equivalent to zero modulo K, the key is rotated. It should be noted that, for the purpose of illustration, a condition that a value be zero modulo K is used throughout the present disclosure for the purpose of illustration, but that other conditions are considered as being within the scope of the present disclosure. For example, instead of checking whether a value is zero modulo another number, whether the value is any positive number modulo another number may be used instead. Conditions that may be used are not necessarily dependent on modular arithmetic. For example, in some embodiments, a sequence of bits (which may be used as a nonce) is generated as an argument to one or more conditions. As an illustrative example, the one or more conditions may be that a specified number of leading or trailing digits are all equal to zero (or, alternatively, one). Generally, arguments and conditions applied to the arguments may be configured to minimize the computational resources required to determine whether the arguments satisfy the conditions.

As noted above, some embodiments perform probabilistic key rotation so as to keep the probability of using a particular nonce and key twice below an acceptable value, such as $\frac{1}{2}^{32}$. Let $P_1(i)$ represent the probability of not rotating the key after $i$ cryptographic operations. In the example of FIG. 6 where a rotation occurs if R is equivalent to zero modulo K for the $i^{th}$ operation that contributes to cryptographic key wear out, assuming there is a $1/K$ probability of R being equivalent to zero modulo K, $P_1(i)$ would equal:

$$P_1(i) = \left(\frac{K-1}{K}\right)^i$$

Also let $P_2(i)$ represent the probability that, given $i$ consecutive operations using the key, the probability that a nonce is repeated. Assuming that a new nonce is randomly generated for each operation, according to the generalized birthday problem, $P_2(i)$ would be equal to:

$$P_2(i) = \begin{cases} \left(1 - \frac{d!}{d^i(d-i)!}\right) & \text{if } 1 \leq i \leq d \\ 1 & \text{if } d > i \end{cases}$$

where d represents the size of the nonce space (e.g., the number of possible nonces). Therefore, given the illustrative process of FIG. 6, the probability of both i consecutive operations performed without a key rotation and the same nonce being used twice after i consecutive operations is $P_1(i)*P_2(i)$. As a result, since the number of operations performed without a key rotation is not known in advance, K (and/or d) may be selected such that $$\sum_{i=1}^{\infty} P_1(i) P_2(i)$$

is within an acceptable bound, such as $\frac{1}{2}^{32}$. Generally, the above expression can be kept within an acceptable value for other probability functions which may vary according to the various ways in which arguments for key rotation conditions are determined in accordance with the various embodiments.

Returning to the illustrative example of FIG. 6, accordingly, a determination may then be made 608 whether the random number R that was generated 606 is equivalent to zero modulo K. If it is determined 608 that the random number R is equivalent to zero modulo K the process 600 may include rotating 610 the key such as described above. If, however, it is determined that the random number R is not equivalent to zero modulo K the process 600 may repeat such as described above in order to process additional requests using the same key. In this manner the process 600 may repeat until a random number R is generated that is equivalent to zero modulo K at which point the key is rotated.

As with all processes described herein, variations of the process 600 are considered as being within the scope of the present disclosure. For example, the process may be adapted for different ways of generating arguments for conditions that may result in different probability distributions. Similarly, the event (or multiple events) for which a probability of occurring is kept under an acceptable value may differ according to the various cryptographic processes used in various embodiments (e.g., different modes of AES and, generally, different ciphers and ways of using ciphers) and/or according to various tolerance for risk of such events occurring. For instance, values may be modified so that more operations, on average, are performable between key rotations for data that is considered less sensitive than other data for which fewer operations are, on average, performable for data that is considered more sensitive. As another example, the random number R may also be used in performance of the cryptographic operation. For example, R may be the nonce used in a cipher that uses nonces. As another example, the nonce used in a cipher that uses nonces may be generated using a function that takes R as input. As one example, the nonce may be a specified number of trailing digits of R. Generally, R may be used as input to a cryptographic process involving the key.

Figure 7:
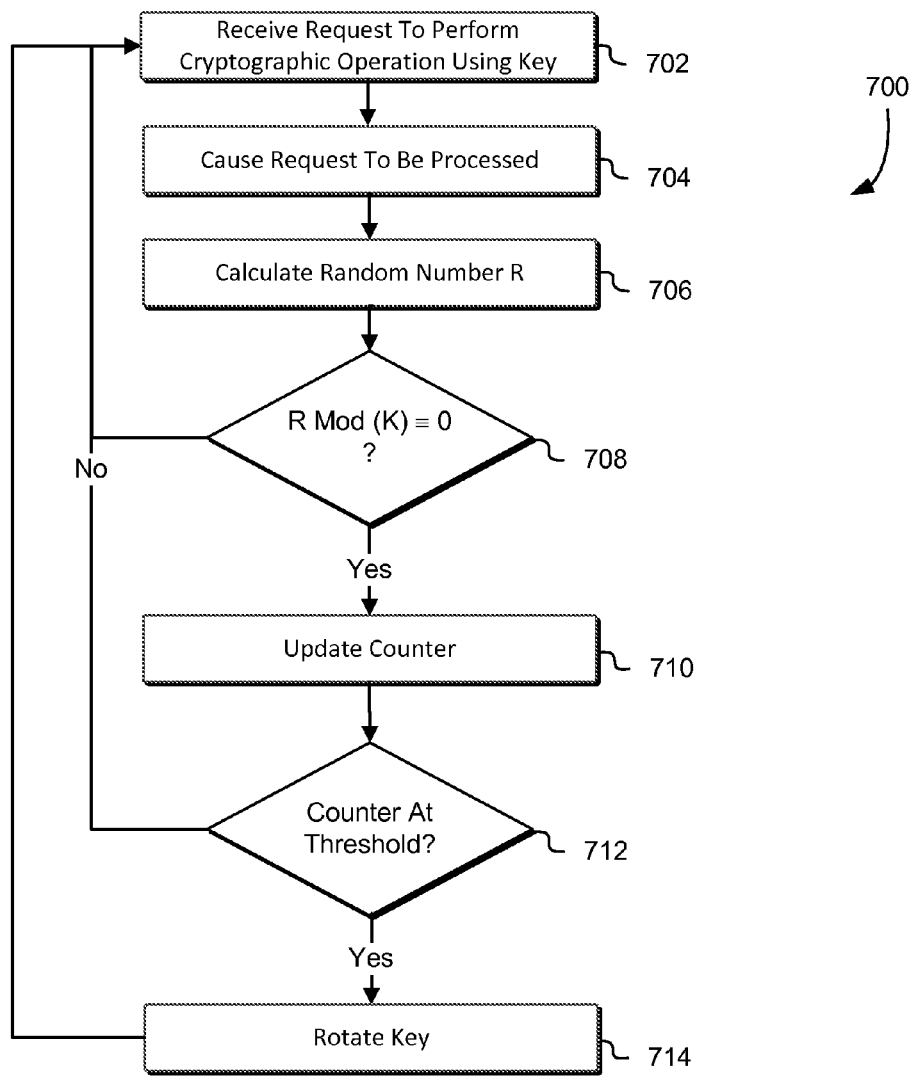
FIG. 7 shows an illustrative example of a process for managing key rotation in accordance with an embodiment.

Various enhancements to the techniques described herein are usable to improve system performance and efficiency. For example, in a distributed system where a key is shared among numerous devices of the system, key rotation can be a complex process, especially when measures are taken to ensure that data is encrypted using a proper key. Adaptations to the processes described herein may be made to ensure, on average, a larger number of operations using a key before the key is rotated. FIG. 7, for instance, shows an illustrative example of a process 700 which may be performed to manage rotation of cryptographic keys in accordance with various embodiments. As illustrated, the process 700 illustrated in FIG. 7 is a variation of the process 600 described above with FIG. 6. As illustrated in FIG. 7 the process 700 includes receiving 702 a request to perform a cryptographic operation using a key where the request may be received and configured such as described above. Similarly, the process 700 includes causing 704 the request to be processed and calculating 706 a random number R, where R may be as described above in connection with FIG. 6.

As with the process 600 described above in connection with FIG. 6, the process 700 illustrated in FIG. 7 includes determining 708 whether the random number R is equivalent to zero modulo K. If it is determined 708 that the random number R is equivalent to zero modulo K, instead of rotating the key as illustrated in FIG. 6, the process 700 includes updating 710, a counter. In this example, the counter is a probabilistic counter since the counter is updated upon the occurrence of an event that has a probability less than one of occurring. The counter may be maintained centrally, such as by a security module coordinator described above in connection with FIG. 3 or by another component of a cryptography service or other system that performs cryptographic operations. Accordingly, updating the counter may include transmitting a request to the component maintaining the counter to update the counter.

A determination may then be made 712 whether the counter has met a threshold. If it is determined 712 that the counter has reached the threshold the key may be rotated 714 such as described above. If it is determined 708 that the random number R is not equivalent to zero modulo K or if it is determined 712 that the counter has not reach the threshold, the process 700 may be repeated such as described above so that the key may be continued to be used for additional operations until it is both determined 708, 712 that the random number R is equivalent to zero modulo K and that the counter has reached the threshold. In this manner, a counter is maintained for the key without having to account for every operation in which the key is performed, thereby reducing the burden of maintaining a counter and allowing on average more operations to be performed before the key is rotated.

In the process 700 described above in connection with FIG. 7, let $P_1(i)$ be the probability of the counter having a value T (T an integer), given i operations performed using the key. In other words, $P_1(i)$ can be expressed as the probability of updating the counter T−1 times in the first i−1 operations multiplied by the probability of updating the counter to T on the $i^{th}$ operation. The probability of updating the counter T−1 times in the first i−1 operations follows a binomial distribution and the probability of updating the counter on the $i^{th}$ operation is, in this example, 1/K. Therefore, $P_1(i)$ can be expressed as:

$$P_1(i) = \begin{cases} \binom{i-1}{T-1}\left(\frac{1}{K}\right)^T\left(\frac{K-1}{K}\right)^{i-T} & \text{if } T \leq i \\ 0 & \text{if } T > i \end{cases}$$

If $P_2(i)$ represents the probability of a repeated nonce after i consecutive operations using the same key, as described as above, then T and K can be selected such that $$\sum_{i=1}^{\infty} P_1(i)P_2(i)$$

which represents the probability that there will be a repeated nonce before a key rotation is performed, is within an acceptable limit, such as described above. In some embodiments, T is selected based on practical considerations, such as based on a decision how often the counter can be updated without unduly burdening the system, and K can be computed based on the selected value of T. Similarly, K may be selected and a value for T may be computed. Computing a value for K or T may be performed in any suitable manner, which may include using functions that approximate the various components of the mathematical expressions above (or otherwise used) but that are computationally easier to calculate.

As noted above, variations are considered as being within the scope of the present disclosure. For instance, the above formulas represent probabilities in accordance with specific embodiments. Different formulas may be used for different systems, different cryptographic ciphers, different security concerns, different levels of acceptable risk, and the like. In addition, as noted, various embodiments of the present disclosure involve rotation of keys that are managed by an entity on behalf of a customer of the entity. In such embodiments, various key rotation parameters may be customizable (e.g., via appropriately configured API calls) so that customers can tailor the average frequency of key rotations as desired. For instance, in some embodiments, customers may customize the acceptable probability of an undesirable event occurring. As another example of a variation considered as being within the scope of the present disclosure, additional probabilities may be taken into account. For instance, as noted above, variations of the present disclosure utilize a probabilistically updated counter. Probability distributions discussed above (which relate to a particular illustrative embodiment) assume that a counter is actually updated when the outcome of a stochastic process satisfies certain conditions. As noted, however, distributed systems may have multiple devices may be involved in a system and multiple devices may utilize techniques described herein (e.g., by making probabilistic key rotation determinations). As a result, a central counter may be maintained and updated over a network by the devices performing the stochastic processes that may result in update to the counter. There may be a nonzero probability of the counter being updated (e.g., due to possible network failure, device failure, etc.) when a device sends a request to a system maintaining the counter to update the counter. This probability may be estimated (e.g., through analysis of logs of past activity) and included into probability distributions as appropriate so that the probability of a counter failing to update does not cause the probability of an undesirable event from occurring from exceeding a desirable value.

Figure 8:
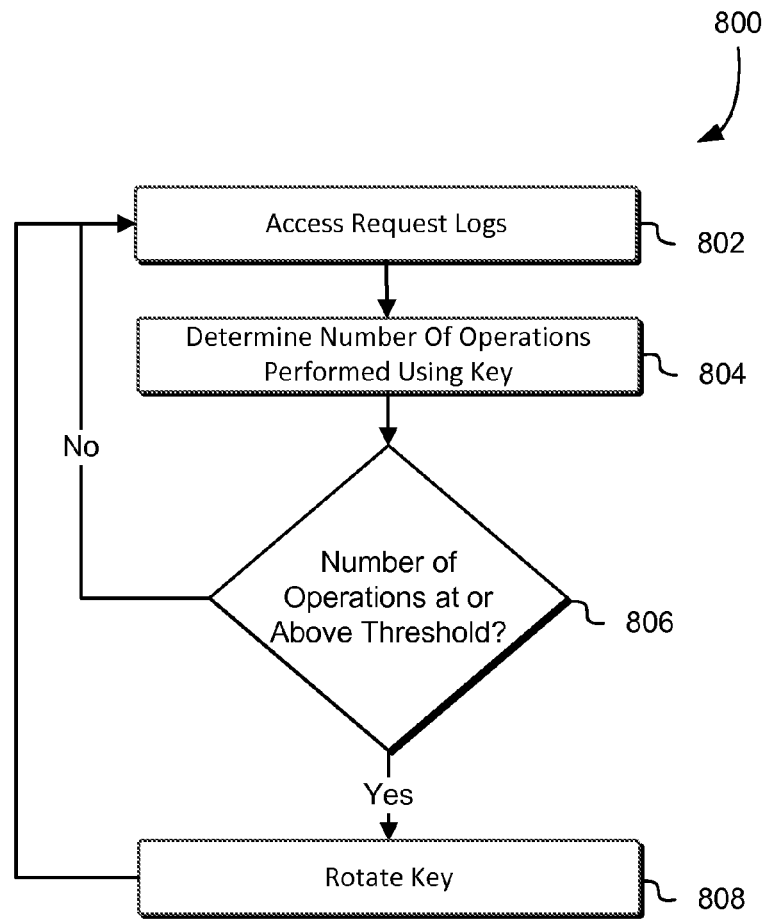
FIG. 8 shows an illustrative example of a process for managing key rotation in accordance with an embodiment.

As illustrated in FIGS. 5, 6 and 7 various embodiments of the present disclosure determine whether to rotate keys as a result of receiving requests to perform operations using the keys. The illustrative examples provided in FIGS. 5, 6 and 7 make this determination synchronously, that is when triggered by a request that has been received. Variations of the techniques used herein may also be performed asynchronously. For example, FIG. 8 shows an illustrative example of a process 800 which may be used to manage key rotation. Instead of certain operations being performed in response to a receipt of a request to perform an operation, the process 800 is performed independent of any request received. As illustrated in FIG. 8 the process 800 includes accessing 802 request logs, which may be logs that store information related to when requests were performed. For instance, referring to FIG. 3, logs may be accessed from the logging module to access request logs related to a particular key or account corresponding to a particular key. The process 800 may include determining 804 a number of operations performed using the key based at least in part on the information in the accessed request logs. Determining 804 the number of operations performed using the key may be performed in various ways in accordance with various embodiments. For example, in some embodiments the request logs are processed to determine an accurate count of the number of operations that have been performed using the key at the time the logs were last updated. In other embodiments, the requests logs sampled to estimate the number of operations that have been performed using the key.

Once the number of operations has been determined 804 the process 800 may include whether the determined number of operations has reached a threshold number of operations. The threshold may be determined to keep the probability of a particular event from occurring, such as repeated use of a nonce with the same cryptographic key, within an acceptable range. If it determined 806 that the number of operations has reached the threshold the process 800 may include rotating 808 the key such as described above.

Numerous variations of the process 800 may be performed. For example, the frequency at which logs are accessed may vary in accordance with the frequency at which requests to perform operations using a specified key are submitted. To prevent cryptographic key wear out, the frequency at which logs are accessed and analyzed may be set such that, based on past behavior in connection with the key, a customer is unlikely to cause cryptographic key wear out faster than a need to rotate the key is detected based at least in part on analysis of the logs. In other words, the more frequently a key is used, the more frequently logs may be accessed (and/or updated) and analyzed to detect a need to rotate the key before the customer is able to cause cryptographic key wear out. Also, as discussed above, the frequency at which keys are rotated and the frequency at which logs are accessed and analyzed may vary in accordance with the particular type of key wear out for which there is risk. As discussed above, the particular type of key wear out may differ depending on the particular cipher used.

Figure 9:
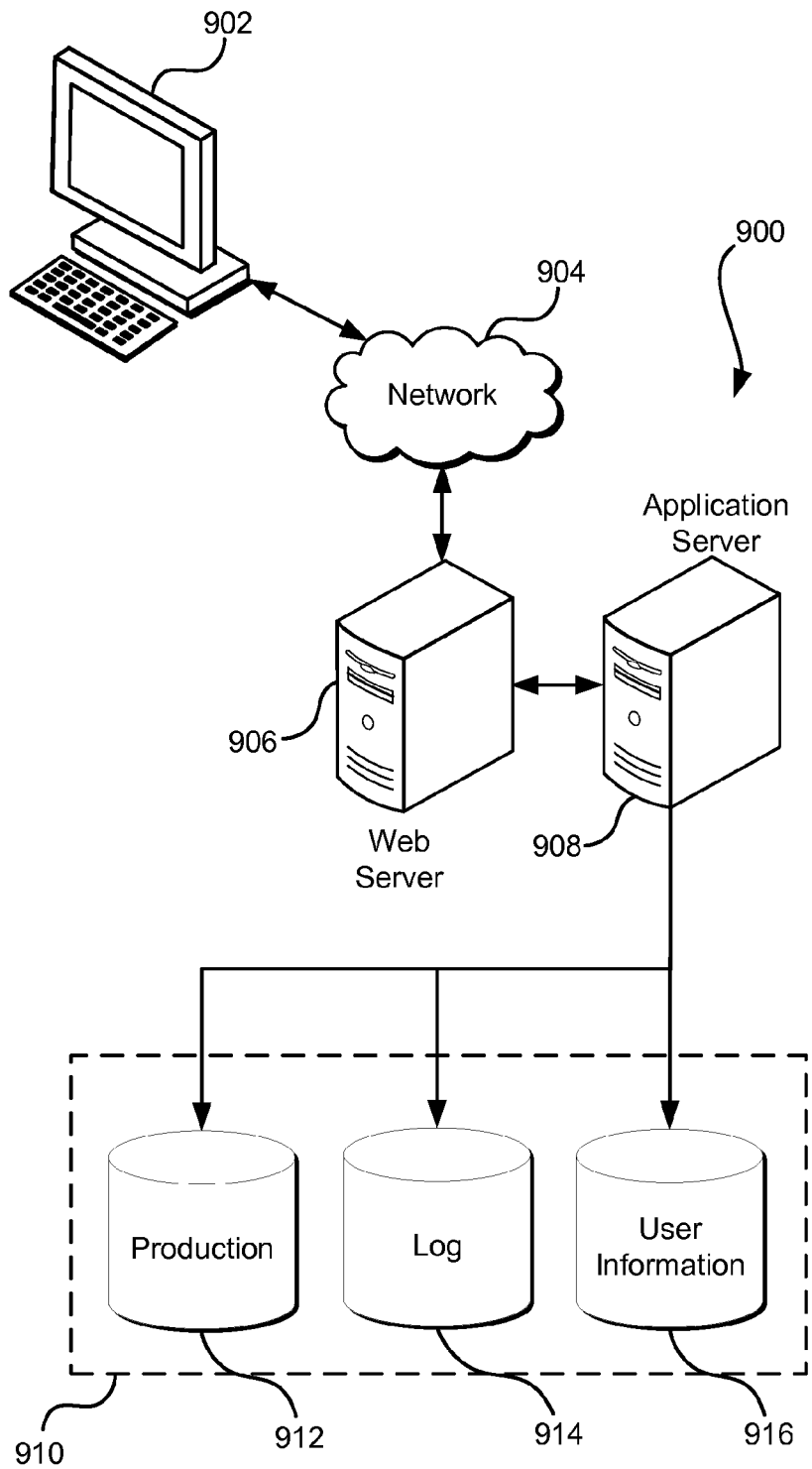
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 902 and the application server 908, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 910 can include several separate data tables, databases or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to? requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing cryptographic keys in a distributed system, comprising:
   under the control of one or more computer systems configured with executable instructions,
      storing a first cryptographic key in each of a plurality of security modules;
      receiving a request to perform an operation, the performance of which involves an encryption operation using the first cryptographic key specified in the request; and
      as a result of receiving the request:
         causing a selected security module from the plurality of security modules to perform the encryption operation using the first cryptographic key;
         performing a stochastic process to generate a value; and
         when the value satisfies a set of key rotation criteria that limit the probability of using the same nonce multiple times with the first cryptographic key, causing each security module of the plurality of security modules to replace the first cryptographic key with a second cryptographic key.

2. The computer-implemented method of claim 1, wherein: the encryption operation includes stochastic generation of a nonce.

3. The computer-implemented method of claim 1, wherein the value is output of a random or pseudorandom value generator.

4. The computer-implemented method of claim 1, wherein: the stochastic process comprises:
   randomly or pseudorandomly generating an initial value; and
   as a result of the generated initial value satisfying a set of counter update conditions, determining the value by updating a counter.

5. The computer-implemented method of claim 1, wherein causing the selected security module to perform the encryption operation using the first cryptographic key includes causing the selected security module to use the value when performing the encryption operation.

6. The computer-implemented method of claim 1, wherein the first cryptographic key is accessible to each security module of the plurality of security modules.

7. A computer-implemented method, comprising:
   under the control of one or more computer systems configured with executable instructions,
      as a result of a received request to perform an operation, the performance of which involves use of first information:
         determining a stochastically generated value;
         when the stochastically generated value satisfies a set of rotation criteria that limit the probability of using the same nonce multiple times with the first information, replacing the first information with second information; and
         when the stochastically generated value fails to satisfy the set of rotation criteria, allowing the first information to be used to perform the operation at least one additional time in response to another request.

8. The computer-implemented method of claim 7, wherein the first information is a cryptographic key.

9. The computer-implemented method of claim 7, wherein the stochastically generated value is based at least in part on output of a random or pseudorandom number generator.

10. The computer-implemented method of claim 7, wherein the stochastically generated value is a probabilistically updated counter.

11. The computer-implemented method of claim 7, wherein the method further comprises:
   receiving the request;
   selecting, from a plurality of devices each with access to the first information and capable of performing the operation, a device to perform the operation; and
   causing the selected device to perform the operation.

12. The computer-implemented method of claim 7, wherein the method further comprises causing the stochastically generated value to be used to perform the operation.

13. A system, comprising:
   a plurality of computing devices that each store first information;

a request processing subsystem comprising a collection of computing resources collectively configured to:
   process requests to perform operations involving the first information by at least, for each request of a plurality of the requests, selecting a computing device from the plurality of computing devices to use the first information as part of processing the request; and
   generate rotation determinations probabilistically in a manner that limits use of the same nonce with the first information multiple times such that, as a result of a rotation determination indicating rotation, the plurality of computing devices use second information instead of the first information.

14. The system of claim 13, wherein:
the first information is a cryptographic key; and
the operations include cryptographic operations using the cryptographic key.

15. The system of claim 13, wherein probabilistically generating rotation determinations includes determining a random or pseudorandom value and checking whether the rotation determination satisfies one or more conditions.

16. The system of claim 13, wherein probabilistically generating rotation determinations includes probabilistically updating a counter that, when the counter satisfies one or more conditions, results in a rotation determination indicating rotation.

17. The system of claim 13, wherein at least a subset of the rotation determinations are each generated as a result of a corresponding received request to use the first information to perform a corresponding operation.

18. The system of claim 13, wherein:
the requests are web service requests that specify the first information by an identifier for the first information; and
upon replacement of the first information with the second information, the second information is specifiable to the system by the identifier for the first information.

19. A non-transitory computer-readable storage medium having stored thereon instructions that, when executed by one or more processors of a system, cause the system to:
   probabilistically generate rotation determinations in a manner that limits use of the same nonce with first information multiple times, each rotation determination indicating whether to replace the first information with second information when processing requests;
   when a generated rotation determination is positive, cause the first information used in processing requests to be replaced with the second information; and
   when a generated rotation determination is negative, allow the first information to be used for processing additional requests to be processed using the first information.

20. The non-transitory computer-readable storage medium of claim 19, wherein the first information is a first cryptographic key of a plurality cryptographic keys managed by the system.

21. The non-transitory computer-readable storage medium of claim 19, wherein each of at least a subset of the rotation determinations is generated as a result of a received request to perform an operation using the first information.

22. The non-transitory computer-readable storage medium of claim 19, wherein:
the first information is accessible to a plurality of devices of the system; and
causing the first information to be replaced with the second information includes causing the second information to become accessible to each device of the plurality of devices.

23. The non-transitory computer-readable storage medium of claim 19, wherein each rotation determination of at least a subset of the rotation determinations is based at least in part on one or more conditions and a randomly or pseudorandomly generated value.

24. The non-transitory computer-readable storage medium of claim 19, wherein:
probabilistically generating rotation determinations includes probabilistically determining whether to update a counter; and
each rotation determination of at least a subset of the rotation determinations is based at least in part on whether the counter has reached a threshold.

25. The non-transitory computer-readable storage medium of claim 19, wherein each probabilistically generated rotation determination of at least a subset of the probabilistically generated rotation determinations is based at least in part on a determination whether a stochastically generated value is divisible by another value.

26. The non-transitory computer-readable storage medium of claim 19, wherein each probabilistically generated rotation determination of at least a subset of the probabilistically generated rotation determinations is based at least in part on a determination whether a stochastically generated sequence of bits satisfies one or more conditions on the sequence.

* * * * *